United States Patent Office 3,200,773
Patented Aug. 17, 1965

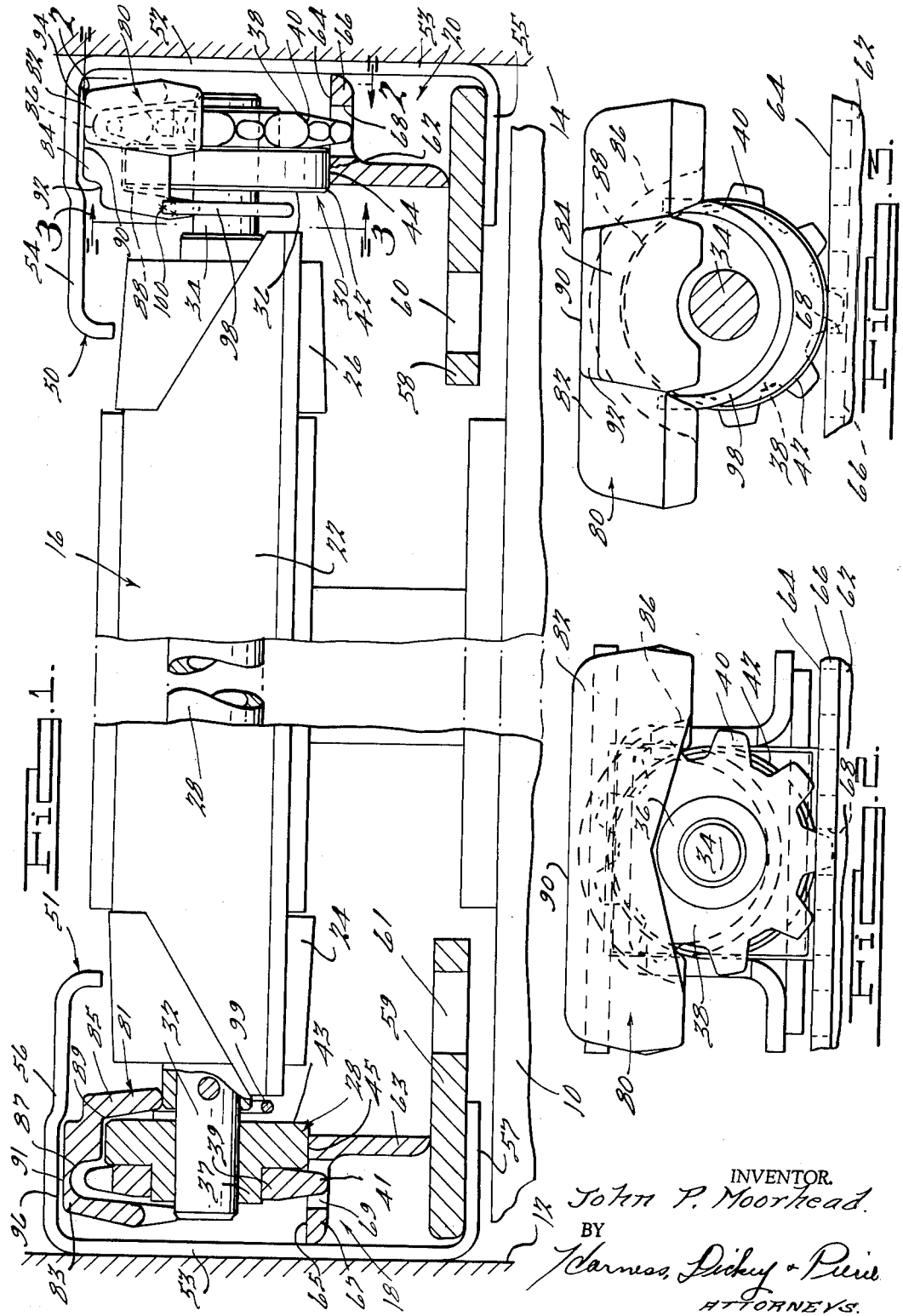

3,200,773
BULKHEAD HOLD DOWN
John P. Moorhead, Plymouth, Mich., assignor to Evans Products Company, Plymouth, Mich., a corporation of Delaware
Filed Mar. 19, 1962, Ser. No. 180,464
12 Claims. (Cl. 105—376)

This invention relates to cargo storage systems and more particularly to a movable bulkhead therefor.

Cargo containers such as railway boxcars are conventionally provided with movable bulkheads for partitioning purposes. The bulkheads extend transversely between opposite side walls of the cargo containers and are movable therealong by means of trolley assemblies which are adapted to cooperate with track assemblies mounted on the side walls. The bulkheads are movable to varying positions along the lengths of the side walls by rolling movement of the trolley assemblies on the track assemblies. One type of trolley assembly comprises cogwheel means rotatably mounted at the edges of the bulkheads adjacent the side walls. The cogwheels are mounted on rails extending the length of the side walls and fixedly secured thereto. The rails are provided with rows of evenly spaced apertures adapted to receive cogs provided on the cog wheels. Movement of the bulkheads along the side walls is accommodated by rolling movement of the cogwheels along guide rails.

The use of cogwheels and guide rails provides a satisfactory arrangement for moving bulkheads along the side walls as long as the cogwheels on each end of the bulkhead are aligned at right angles to the side walls and have the cogs thereof engaging identically positioned cog holes in the rail at the same time. In the use of movable bulkheads in railway vehicles such as boxcars, and to a lesser extent in motor vehicles, the severe vibrations to which the vehicles are subjected in use create problems of cogwheel alignment. During conditions of vibration, the cogs of the cogwheels may be jarred loose from the cog holes in the cogwheel rails on the side walls. Consequently, the cogwheels and bulkhead may become misaligned relative to the desired transverse partitioning position between the side walls. In some instances, the vibration may cause the cogwheels to move along the guide rails on both sides of the bulkhead in the same or opposite directions. In other instances, only one of the cogwheels may move and result in bulkhead misalignment. If the bulkhead misalignment is great enough it may be possible for the bulkhead to become completely detached from the guide and support rails.

It is, therefore, an object of the present invention to provide means to prevent inadvertent movement of a bulkhead.

Another object of the present invention is to provide restraining means to limit cogwheel advancement of a bulkhead to a one cog at a time sequence.

Still another object of the present invention is to provide means for preventing inadvertent removal of a bulkhead cogwheel, or the like, from its associated support structure.

Another object of the present invention is to provide a simplified bulkhead hold down, for securing the cogwheels thereof in cog holes, which is economical to manufacture, sturdy and maintenance free in use, and easily installed with existing equipment.

Other objects and some of the advantages of the present invention will be apparent from the following detailed description and the accompanying drawing wherein:

FIGURE 1 is a side elevational view, partly in section and with parts broken away, of an illustrative embodiment of the present invention;

FIGURE 2 is a partial sectional view taken along the line 2—2 in FIGURE 1; and

FIGURE 3 is a partial sectional view taken along the line 3—3 in FIGURE 1.

Referring now to the drawings, a bulkhead 10 which is adapted to partition space between a pair of parallel side walls 12, 14 is connected at its upper end to a trolley assembly in a conventional manner. The trolley assembly 16 is associated with reversely identical track assemblies 18, 20 which are fixedly secured to and extend along the parallel side walls 12 and 14.

The trolley assembly is of conventional design and comprises a trolley beam 22 having spaced support bearings 24, 26 which rotatably support an axle 28. Cogwheel units 28, 30 are fixedly secured to each end of the rotatable axle 28 by pin means 32, 34 in a conventional manner. The cogwheel units are identical in construction and include hub members 36, 37 and cogwheel members 38, 39. The cogwheels are fixedly secured to the hub members and are provided with a plurality of equally spaced radially extending cogs 40, 41. The portions of the hub members nearest the axle are provided with radially outwardly extending flanges 42, 43 which terminate in cylindrical support rims 44, 45.

The track assemblies comprise substantially C-shaped longitudinally extending channel members 50, 51 having web portions 52, 53 which are fixedly secured to the side walls 12, 14. Each of the channel members have upper and lower side wall portions 54, 55 and 56, 57 which extend inwardly away from the side walls 12, 14. Longitudinally extending plates 58, 59 are fixedly mounted on the lower wall portions and are provided with a plurality of lock holes 60, 61 spaced therealong in which locking pins (not shown) carried by bulkhead 10 are insertable to lock the bulkhead in predetermined positions along the side walls. Angle type structural members 62, 63 are fixedly secured to the plates 58, 59 and the web portions of the channel members in a manner providing flat cogwheel unit support surfaces 64, 65 on horizontally extending leg portions 66, 67. A plurality of equally spaced cog receiving apertures 68, 69 are provided along the leg portions 66, 67.

In the assembled position of the track assembly and the trolley assembly, the cogs of the cogwheels are received in the cogwheel apertures 68, 69 and the cylindrical support rims 44, 45 rotatably support the trolley assembly on the upper surfaces 64, 65 of the angle member. Consequently, the weight of the bulkhead is supported by the radially extending flanges 42, 43 and movement of the bulkhead along the guide rails, formed by the angle members 62, 63 is controlled by the cogs 40, 41 and the cog apertures 68, 69. In normal operation of the apparatus, the cogwheel units are aligned with one another so that the bulkhead extends at right angles to the side walls 12, 14. Consequently, the cogs of each unit are also aligned and have cog-engagement with aligned cog apertures directly opposite one another. During movement of the bulkhead along the rails 62, 63, it is intended that the advancement therealong be made by rotation of the cogs into adjoining cog-receiving apertures one cog at a time without any slippage so as to prevent inadvertent misalignment. In addition, it is also desired to prevent displacement of the cogs from the cog apertures and any movement of the cogwheels during vibration in use after the bulkhead has been properly positioned.

To this end, restraining means 80, 81 are provided between the upper legs 54, 56 of the channel members 52, 53 and the cogwheel units to prevent accidental or inadvertent disengagement of the cogs from the cog apertures. The restraining means are identical and comprise a cap-like casting having cogwheel covering portions 82, 83 and support rim covering rear portions 84, 85. The portions 82, 83 are elongated and provided with contoured cavities 86, 87 within which the cogwheels 38, 39 are adapted to be received in spaced relationship. The cavities 86, 87 have substantially semi-cylindrical peripheries which conform to the peripheral outline of the cogwheels. Contoured cavities 88, 89 are formed in the portions 84, 85 and have substantially semi-cylindrical peripheries which are adapted to be loosely seated on the circumjacent rims 44, 45 and permit rotation of the rims within the cavities.

The restraining means have substantially flat top surfaces 90, 91. The top surfaces 90, 91 terminate in longitudinally extending shoulders 92, 93 formed in the support rim covering portions 84, 85. The upper legs 54, 56 of the channel members have guide channels 94, 96 formed therein having a width substantially corresponding to the width of the upper surfaces of the restraining means. Consequently, guide channels are formed to accommodate movement of the restraining means with the bulkhead along the length of the track assembly.

The spacing of the upper surfaces of the cavities 88, 89 relative to the rims 44, 45 is substantially less than the spacing of the upper surfaces of the cavities 86, 87 relative to cogwheels 38, 39. Consequently, the restraining means are supported by and have peripheral sliding contact with the rims 44, 45. The upper surfaces of the cavities 86, 87 are always spaced above the cogwheels and have no contact therewith. Accordingly, the restraining means are loosely mounted on top of the cogwheel units and are movable relative thereto. In order to prevent separation of the restraining means from the cogwheel units, fastening ring means 98, 99 are welded to the sides of the rim covering portions 84, 85 as shown at 100. The ring means circumscribe portions of the shafts 32, 34 in a loose fitting arrangement relative thereto.

As shown in FIGURE 1, the upper surfaces 90, 91 are spaced relatively closely adjacent the guide channels 94, 96 and the distance between the two surfaces is considerably less than the depth of penetration of the cogs 40, 41 into cogwheel cavities 86, 87. Consequently, the cogwheels cannot be lifted clear of the cogwheel holes 68, 69 in a vertical direction. In this manner the restraining means prevents any inadvertent displacement of the cogwheel assemblies between adjacent sprocket holes due to vibration or the like. In addition, the restraining means prevents misalignment of the cogwheels and bulkhead during bulkhead adjustment since neither of the cogwheel assemblies can be moved forward or rearwardly along the rail without corresponding movement of the other cogwheel assembly.

It is contemplated that the principles of this invention are capable of utilization in alternative embodiments by those skilled in the art to which this invention relates. Accordingly, it is intended that the scope of this invention, as defined by the appended claims, be construed to include alternative embodiments which incorporate the inventive principles herein disclosed.

The invention claimed is:
1. In a bulkhead device having a trolley assembly comprising cogwheel means and support wheel means on the ends thereof, a track assembled adapted to be mounted on supporting structure adjacent said wheel means, said track assembly having means to rotatably support the support wheel means and to receive and retain said cogwheel means, the improvement comprising: separate cap means associated with said cogwheel means and said support wheel means and being mounted in a position loosely supported on said trolley assembly and overlying said wheel means, fastening means securing said cap means in said position, said cap means having an abutment surface extending substantially across said wheel means from end to end and side to side thereof, and abutment means adapted to be mounted on supporting structure adjacent said cogwheel means and said support wheel means and being located above said cap means to prevent said wheel means from being inadvertently displaced from said track assembly by engagement with said abutment surfaces.

2. The invention as defined in claim 1 and wherein said cap means includes a guide portion formed on the upper surface thereof, and said abutment means having guide channel means formed therein to receive said guide portion.

3. In a system for supporting a door or the like for movement along spaced parallel side walls; track assemblies on each side wall each comprising a substantially C-shaped longitudinally extending channel member having a web portion and spaced inwardly extending upper and lower side wall portions defining a trolley space therebetween, longitudinally extending track means mounted on the lower side wall portion and having a flat upwardly facing cogwheel unit support surface, a plurality of equally spaced cog receiving apertures provided along said support surface; cogwheel assemblies on each side of the door adjacent the side walls each comprising a cogwheel having a plurality of radially outwardly extending cogs equally spaced around the periphery thereof for placement in the cog receiving apertures, a cylindrical support flange fixed to said cogwheel and rotatably supported on said support surface; and restraining means provided within the trolley space between the upper side wall portion and the cogwheel assemblies to prevent accidental or inadvertent displacement of the cogs from the cog apertures.

4. The invention as defined in claim 3 and wherein guide groove means are provided in the upper side wall portion to receive the restraining means and limit movement of said cogwheel assemblies.

5. The invention as defined in claim 3 and wherein said restraining means comprises a cap-like housing having a cogwheel covering portion and a support flange covering portion.

6. The invention as defined in claim 5 and wherein the portions of said cap-like housing are elongated and provided with contoured cavities adapted to receive said cogwheel and said support flange.

7. The invention as defined in claim 6 and the cavity for said cogwheel being substantially semi-cylindrical and conforming to the peripheral outline of the cogwheel and receiving the cogs in spaced relationship permitting rotation of the cogwheel therewithin, and the cavity for said support flange being substantially semi-cylindrical and conforming to the peripheral outline of the support flange and being loosely seated on the support flange permitting rotation of the support flange relative thereto while maintaining a spaced relationship between the cogwheel and the cap like housing.

8. The invention as defined in claim 4 and wherein the top surfaces of said restraining means are substantially flat and have a width substantially corresponding to the width of said guide groove means.

9. The invention as defined in claim 5 and having fastening ring means connected to the cap like housing and surrounding portions of the cogwheel assembly in a loose fitting arrangement relative thereto.

10. The invention as defined in claim 5 and wherein the distance between the top surface of the cap like housing and the guide groove means being such as to prevent any inadvertent displacement of either of the cogwheel assemblies between adjacent sprocket holes without corresponding displacement of the other of the cogwheel assemblies.

11. In a system for supporting a door or the like for movement along spaced parallel side walls; track assemblies adapted to be mounted on support structure adjacent said door along each side wall, each of said track assemblies comprising a track means having a support surface for receiving a wheel assembly and a guide groove surface spaced therefrom; wheel assemblies on each side.

of the door adjacent the side walls, each comprising a guide wheel means having a first peripheral diameter and a support wheel means having a second peripheral diameter varying from the peripheral diameter of said guide wheel means, said support surface of said track means being adapted to receive and support said guide wheel means and said support wheel means, said guide wheel means and said support wheel means being mounted on and supported by said support surface of said track means; and restraining means mounted on and overlying and supported by said wheel assemblies and extending toward said guide groove surface, a portion of said restraining means being located closely adjacent said guide groove and preventing accidental or inadvertent displacement of said wheel assemblies.

12. The invention as defined in claim 11 and wherein said restraining means comprises a cap like housing, separate wheel covering portions for said first wheel and said second wheel, at least one of said wheel covering portions being loosely seated on one of the wheels and supporting said housing relative to the wheel assembly.

References Cited by the Examiner
UNITED STATES PATENTS

| | | | |
|---|---|---|---|
| 904,525 | 11/08 | Frederick | 105—29 |
| 949,067 | 2/10 | Frye | 16—102 |
| 2,737,919 | 3/56 | McRae | 160—188 X |
| 2,978,994 | 4/61 | Miller | 105—376 |
| 3,005,419 | 10/61 | Loomis et al. | 105—376 |
| 3,017,842 | 1/62 | Nampa | 105—376 |

MILTON BUCHLER, *Primary Examiner.*

LEO QUACKENBUSH, JAMES S. SHANK, *Examiners.*